United States Patent
Lee

(10) Patent No.: US 11,473,643 B2
(45) Date of Patent: Oct. 18, 2022

(54) AIR SPRING

(71) Applicants: Hyundai Motor Company, Seoul (KR); Kia Motors Corporation, Seoul (KR)

(72) Inventor: Sang Tae Lee, Yongin-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 136 days.

(21) Appl. No.: 17/106,422

(22) Filed: Nov. 30, 2020

(65) Prior Publication Data

US 2022/0034381 A1 Feb. 3, 2022

(30) Foreign Application Priority Data

Jul. 30, 2020 (KR) .......................... 10-2020-0095247

(51) Int. Cl.
| | |
|---|---|
| *F16F 9/05* | (2006.01) |
| *F16F 9/42* | (2006.01) |
| *F16F 9/04* | (2006.01) |
| *F16F 9/32* | (2006.01) |
| *F16F 9/43* | (2006.01) |

(52) U.S. Cl.
CPC .............. *F16F 9/42* (2013.01); *F16F 9/0409* (2013.01); *F16F 9/0445* (2013.01); *F16F 9/3292* (2013.01); *F16F 9/43* (2013.01); *F16F 2222/025* (2013.01)

(58) Field of Classification Search
CPC ...... F16F 9/0409; F16F 9/0445; F16F 9/3292; F16F 9/42; F16F 9/43; F16F 2222/025; B60G 11/27; B60G 17/09; B60G 2202/152
See application file for complete search history.

(56) References Cited

U.S. PATENT DOCUMENTS

| | | | | |
|---|---|---|---|---|
| 4,296,705 A * | 10/1981 | Uruta | ..................... | F16F 9/0409 267/140 |
| 4,763,883 A * | 8/1988 | Crabtree | ............... | B29C 53/665 264/103 |
| 5,201,499 A * | 4/1993 | Elliott | ................... | F16F 9/0409 267/64.23 |
| 5,975,506 A * | 11/1999 | Thurow | ................. | B60G 11/27 267/64.23 |
| 6,264,178 B1 * | 7/2001 | Schisler | ............... | F16F 9/0409 267/64.27 |
| 6,431,529 B1 * | 8/2002 | Maeda | ................. | F16F 9/0409 267/64.24 |

(Continued)

FOREIGN PATENT DOCUMENTS

| | | | | |
|---|---|---|---|---|
| DE | 102015118395 A | | 5/2017 | |
| EP | 1426649 A2 * | | 6/2004 | ............ B60G 15/14 |

(Continued)

*Primary Examiner* — Thomas W Irvin
(74) *Attorney, Agent, or Firm* — Morgan, Lewis & Bockius LLP

(57) ABSTRACT

An air spring may include a first end member and a second end member spaced from each other; a flexible bellows having a first end portion airtightly coupled to the first end member, a second end portion airtightly coupled to the second end member, and a jacket mounted on the circumference of the flexible bellows and configured to support the flexible bellows.

19 Claims, 15 Drawing Sheets

(56) References Cited

U.S. PATENT DOCUMENTS

| | | | | |
|---|---|---|---|---|
| 7,063,308 B2 * | 6/2006 | Binder | ............... | F16F 9/0409 |
| | | | | 267/64.27 |
| 8,286,473 B2 * | 10/2012 | Rensel | ............... | F16F 9/3292 |
| | | | | 73/146 |
| 8,461,241 B2 * | 6/2013 | Agarwal | ............ | F16F 9/0409 |
| | | | | 267/64.27 |
| 9,163,689 B2 * | 10/2015 | Agarwal | ............ | C08L 11/00 |
| 2004/0130080 A1 * | 7/2004 | Binder | ............... | F16F 9/0409 |
| | | | | 267/64.27 |
| 2006/0117843 A1 * | 6/2006 | Reck | ............... | B60G 17/019 |
| | | | | 73/161 |
| 2010/0117274 A1 * | 5/2010 | Agarwal | ............ | F16F 9/0409 |
| | | | | 264/239 |
| 2011/0083500 A1 * | 4/2011 | Rensel | ............... | B29D 22/023 |
| | | | | 73/117.03 |
| 2014/0217656 A1 * | 8/2014 | Agarwal | ............ | C08L 11/00 |
| | | | | 267/122 |
| 2021/0061038 A1 * | 3/2021 | Heon | ............... | F16F 9/0427 |

FOREIGN PATENT DOCUMENTS

| | | |
|---|---|---|
| GB | 2456750 A | 7/2009 |
| JP | 2000-088029 A | 3/2000 |
| JP | 2003-049888 A | 2/2003 |
| JP | 2003-511639 A | 3/2003 |
| KR | 1995-0002556 B | 3/1995 |
| KR | 10-2014-0030179 A | 3/2014 |
| WO | WO 2012-136650 A | 10/2012 |

* cited by examiner

CL

CL

AIR SPRING

CROSS-REFERENCE TO RELATED APPLICATION

The present application claims priority to Korean Patent Application No. 10-2020-0095247, filed on Jul. 30, 2020, the entire contents of which is incorporated herein for all purposes by this reference.

BACKGROUND OF THE INVENTION

Field of the Invention

The present invention relates to an air spring and, more specifically, to an air spring with improved durability.

Description of Related Art

An air spring in a vehicle is used for improving ride comfort or steering stability or maintaining a vehicle height. The upper end portion of the air spring is connected to a vehicle body by an end cap, and the lower end portion of the air spring is connected to a steering knuckle by a lower arm. A bellows, which is a main component of the air spring has the high pressure air of about 8 to 10 bar therein to absorb external vibration or shock and is made of a composite of rubber and cord yarns to endure the high pressure air. If a suspension device for a vehicle is bumped or rebounded and/or if a steering device is steered, excessive torsion or cardanic movement occurs in the bellows.

As illustrated in FIG. 1A, a bellows in one of conventional air springs includes an internal cord layer and an external cord layer for absorbing torsion or cardanic movement. The internal cord layer and the external cord layer include internal cord yarns 401 and external cord yarns 403 to endure the high pressure air in the flexible bellows. The internal cord yarns 401 and the external cord yarns 403 overlap with each other at a predetermined interval in a thickness direction of the bellows. Both the internal cord yarns 401 and the external cord yarns 403 are disposed to be inclined at any angle with an axial center line (CL) of the air spring, but the cord yarns 401, 403 are disposed at angles opposite direction to each other. This arrangement is referred to as a so-called cross ply structure.

The rubber of the bellows may have the cross ply structure, avoiding stress concentration even in various movements. However, as illustrated in FIG. 1B, if torsion is excessive, the cord yarns lose tensile force (the arrows marked in the respective cord yarns 401, 403 in FIG. 1A and FIG. 1B mean the directions of the applied forces), and if such a phenomenon is repeated, there occurs a problem in that the cord yarns are unwound into several strands and then damaged (marked by the dotted line in FIG. 1B).

Referring to FIG. 2, another conventional air spring includes only a cord layer so that the cord yarn does not lose tensile force even in excessive torsion. The cord layer has one type of cord yarns 400 configured for enduring the high pressure air in the bellows and is configured as a so-called axial ply structure in which the cord yarns 400 are disposed parallel to the axial center line (CL) of the air spring.

Since the cord yarns 400 receive only the tensile force (marked by the arrow in FIG. 2) even by the steering in any direction in the axial ply structure, there is no damage in the cord yarns due to the loss of the tensile force. However, in long-term use, the rubber bellows is continuously aged, lowering a physical property, such as tensile strength or elongation and, stress concentration occurs in the rubber between the cord yarns upon load operation of a circumferential load or a front-end directional load due to the influence by the engine heat, causing damage.

To solve the problem, various developments have been conducted for the air spring configured for improving torsion absorption ability and preventing stress concentration in combination of the cross ply structure and the axial ply structure.

A related art includes an air spring assembly for a vehicle. As illustrated in FIG. 3A, a first section 411 of the bellows absorbs torsion with the axial ply structure (AP), and a second section 413 prevents stress concentration due to rubber aging with the cross ply structure (CP). An overlapping section 415 is formed between the first section 411 and the second section 413, and the cord layer of the first section 411 and the cord layer of the second section 413 are vulcanized and bonded to be integrated in the overlapping section 415.

The structure tends to have lower torsion absorption ability due to a short axial ply section in the side direction of the bellows. In addition, since the axial ply structure and the cross ply structure are separately manufactured and then connected by the bonding, a manufacturing process is complex. In addition, since the cord yarns in the first section 411 and the second section 413 are not directly connected to each other and connected by only a rubber portion 417 in the overlapping section 415 (see FIG. 3B), the load transfer ability is reduced and the general effect of a cross ply structure may not be expected. In addition, the quality may be lowered by structural complexity.

FIG. 4 illustrates the bellows included in a related art. The bellows included in the related art is formed of a first section 421 and a second section 423. An external cord layer 425 has an integral axial ply structure throughout the first section 421 and the second section 423. The internal cord layer 427 has a unidirectional cross ply structure in the second section 423. Therefore, the first section 421 is provided to absorb torsion and the second section 423 is provided to prevent stress concentration.

However, since the cross ply structure is biased only unidirectionally (the internal cord layer 427 is inclined toward the left lower end portion thereof in FIG. 4) and so torsion rigidities or frictions are different from each other in the left and right, the driver may feel minute sense of difference for steering sense. In addition, since other directions not biased do not support the load, an effect of preventing stress concentration in the rubber portion is lowered compared to the bidirectional cross ply structure. In addition, an overlapping boundary portion 429 formed by the internal cord layer 427 and the external cord layer 425 is disposed to be close to the motion portion of the bellows, degrading the durability of the overlapping boundary portion 429, and causing a quality problem due to the complicated structure upon vertical motion or torsion motion of the bellows In addition, as illustrated in FIG. 5, the related art further forms an additional cord layer 431 of the cross ply structure to have the bidirectional cross ply structure. However, this structure has a problem in that the bellows in the motion portion of the bellows in which damage mainly occurs is very thick and thus increases friction, lowering ride comfort, and inevitably lowering durability due to the frequent bending motion of the bellows.

Therefore, an air spring configured for increasing the period of use even while preventing damage of the bellows by providing a structure with improved durability and robustness is still needed to be devised.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an air spring with improved durability.

Another object of the present invention is to provide an air spring including a bellows configured for avoiding stress concentration due to aging and having excellent torsion movement absorption ability.

The objectives of the present invention are not limited to the above-mentioned objectives, and other objectives not mentioned are clearly understood by those of ordinary skill in the technical field to which various exemplary embodiments of the present invention belongs from the following description.

In an aspect, an air spring according to various exemplary embodiments of the present invention includes: a first end member and a second end member spaced from each other; a flexible bellows having a first end portion airtightly coupled to the first end member, a second end portion airtightly coupled to the second end member, a fluid chamber formed in the flexible bellows, and a motion portion having a valley shape, wherein the flexible bellows disposed between the first end member and the second end member is extendable further than the second end member such that a length of the flexible bellows is longer than a distance between the first end member and the second end member and returns to the second end member to be coupled to the second end member to form the motion portion; and a jacket mounted on the circumference of the flexible bellows and configured to support the flexible bellows, wherein the flexible bellows includes: inner cords formed in the flexible bellows at a side of the fluid chamber; and external cords formed outward than the internal cords in the flexible bellows, wherein the internal cords and the external cord are aligned to extend in parallel to each other in the flexible bellows other than the motion portion, and wherein in the motion portion, the internal cords are aligned to obliquely extend in internal cords are aligned to obliquely extend in a first direction and the external cords are aligned to obliquely extend in a second direction which is a direction opposite to the first direction.

In an aspect, an air spring according to various exemplary embodiments of the present invention includes: a first end member and a second end member spaced from each other, a bellows having a first end portion airtightly coupled to the first end member, a second end portion airtightly coupled to the second end member, a fluid chamber formed in the flexible bellows, and including a plurality of rubber layers and cords, the flexible bellows including: a first portion extending from the first end member and passing the second end member with a predetermined distance to be formed longer than a distance between the first end member and the second end member; a motion portion extending from the first portion and forming a valley by changing a direction toward the second end member; and a second portion extending from the motion portion and coupled to the second end member; a jacket mounted on the circumference of the flexible bellows and configured to support the flexible bellows; a temperature sensor disposed near the motion portion; and a cold air supply unit configured to supply air to an interior of the jacket when the temperature measured by the temperature sensor exceeds a preset temperature.

In various aspects of the present invention as described above and perform the characteristic functions of the present invention to be described later, the present invention has features as follows.

Various aspects of the present invention provide the air spring with the improved durability.

Various aspects of the present invention are directed to providing the air spring including the flexible bellows configured for preventing stress concentration due to aging of the rubber while having the excellent torsion movement absorption ability.

The effects of the present invention are not limited to those described above, and other effects not mentioned will be clearly recognized by those skilled in the art from the following description.

It is understood that the term "automotive" or "vehicular" or other similar term as used herein is inclusive of motor automotives in general such as passenger vehicles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
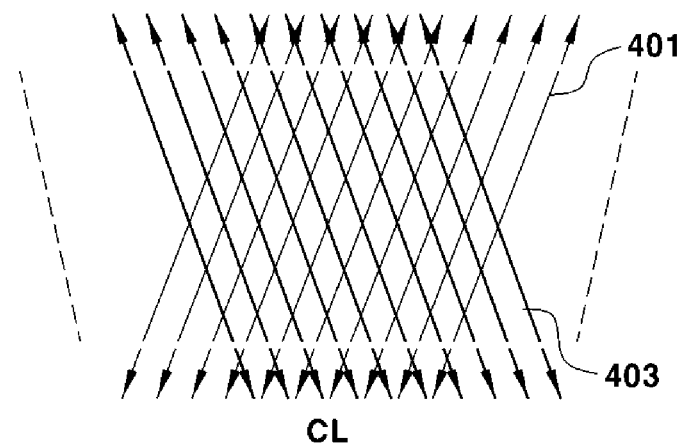
FIG. 1A is a diagram illustrating a cross ply structure of a bellows of an air spring.
Figure 1B:
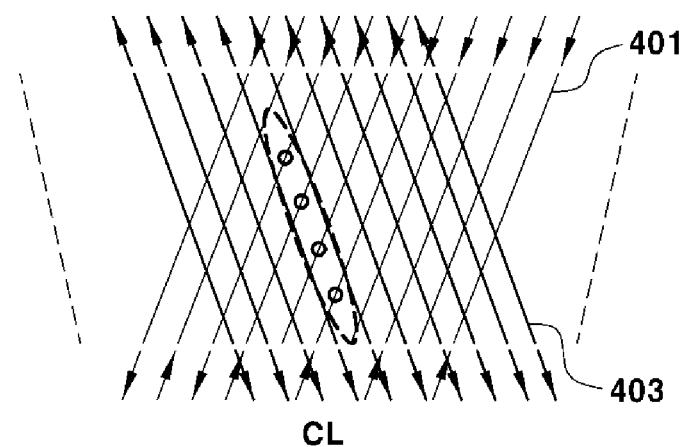
FIG. 1B is a diagram illustrating a state where excessive torsion is applied to the cross ply structure.
Figure 2:
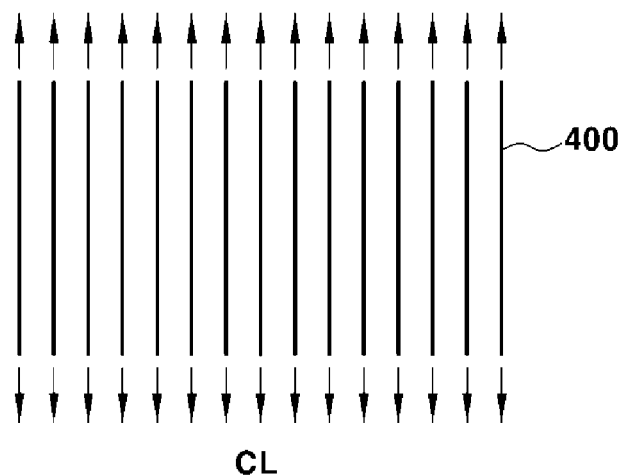
FIG. 2 is a diagram illustrating an axial ply structure of the bellows of the air spring.
Figure 3A:
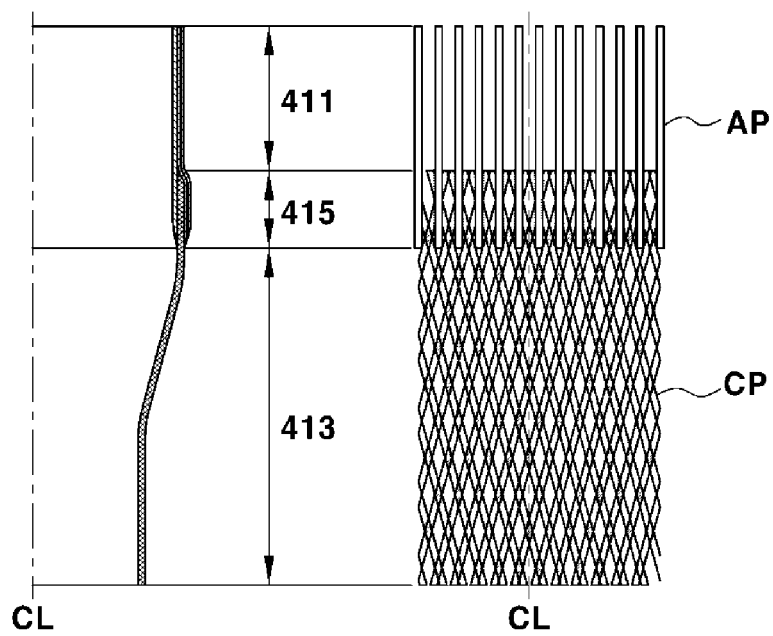
FIG. 3A and FIG. 3B are diagrams illustrating the bellows structure included in a related art.
Figure 3B:
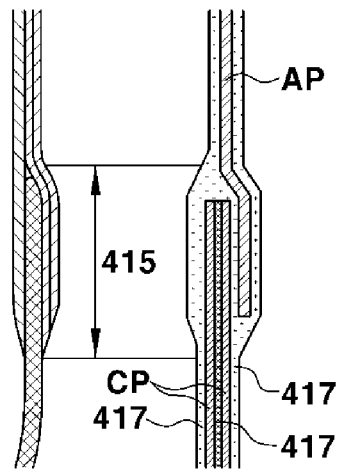
Figure 4:
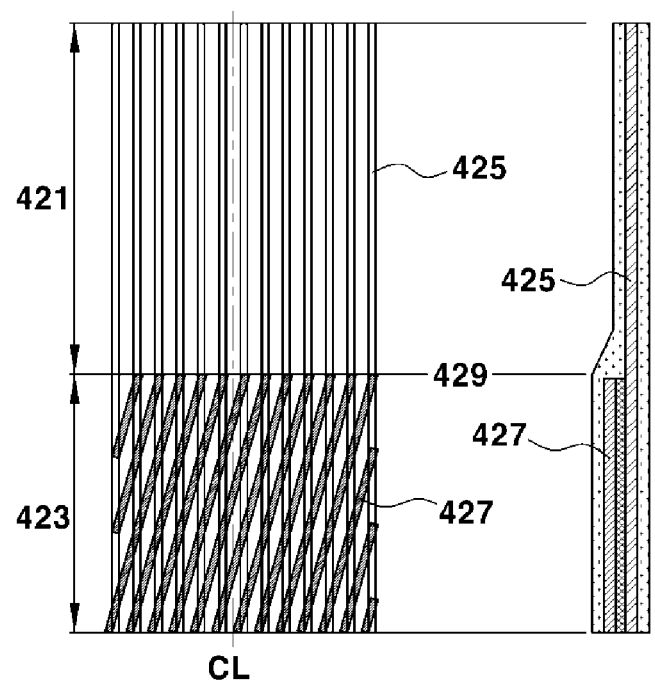
FIG. 4 and FIG. 5 are diagrams illustrating the bellows structure included in a related art.
Figure 5:
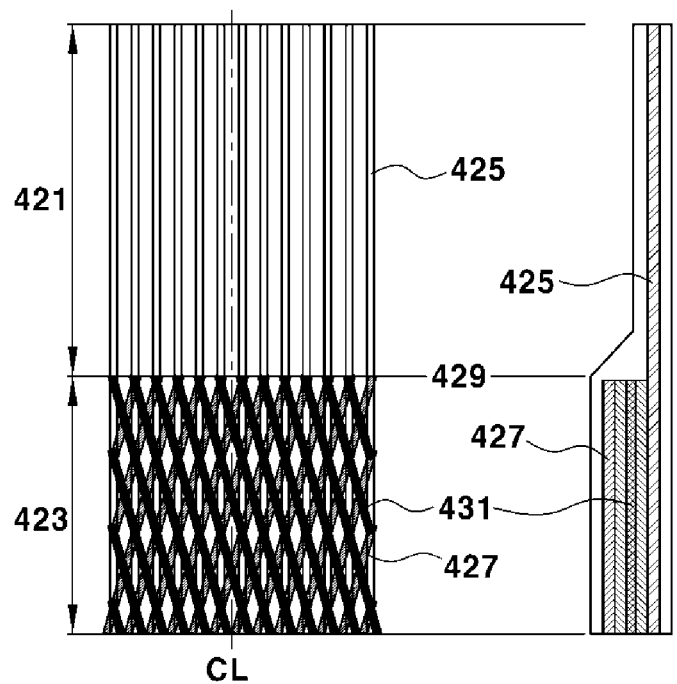

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, exemplary embodiments of the present invention will be described in detail with reference to the accompanying drawings. Specific structures or functions described in the exemplary embodiments of the present invention are merely for illustrative purposes. Embodiments according to the concept of the present invention may be implemented in various forms, and it may be understood that they may not be construed as being limited to the exemplary embodiments described in the present specification, but include all of modifications, equivalents, or substitutes included in the spirit and scope of the present invention.

It will be understood that, although the terms "first," "second," etc. may be used herein to describe various elements, these elements may not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it may be directly coupled or connected to the other element or intervening elements may be present therebetween. In contrast, it may be understood that when an element is referred to as being "directly coupled" or "directly connected" to another element, there are no intervening elements present. Other expressions that explain the relationship between elements, such as "between," "directly between," "adjacent to," or "directly adjacent to," may be construed in the same way.

Like reference numerals denote like components throughout the specification. In the meantime, the terminology used herein is for describing various exemplary embodiments only and is not intended to be limiting. As used herein, the singular forms "a," "an," and "the" are intended to include the plural forms as well, unless the context clearly indicates otherwise. It will be further understood that the terms "comprise," "include," "have," etc., when used in the present specification, specify the presence of stated components, steps, operations, and/or elements, but do not preclude the presence or addition of one or more other components, steps, operations, and/or elements thereof.

Hereinafter, the present invention will be described in detail with reference to the accompanying drawings.

Figure 6:
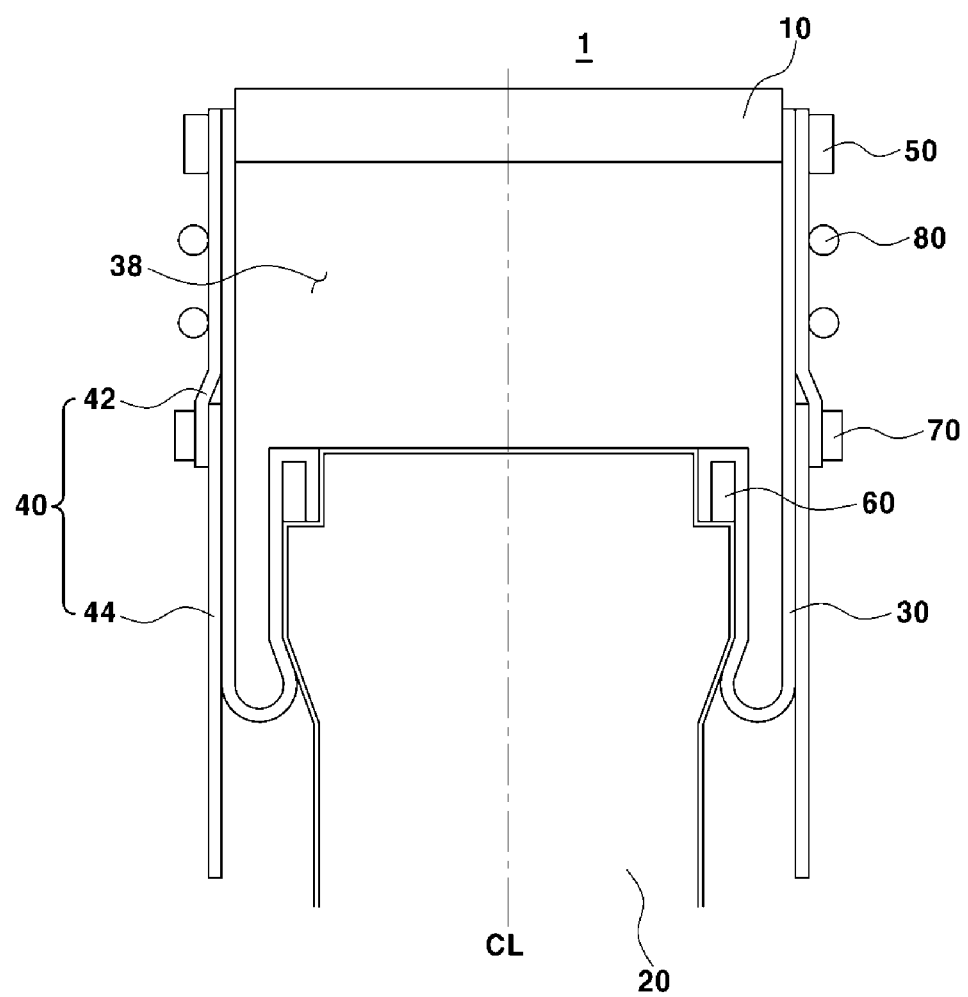
FIG. 6 is a cross-sectional diagram illustrating an air spring according to various exemplary embodiments of the present invention.
Figure 7:
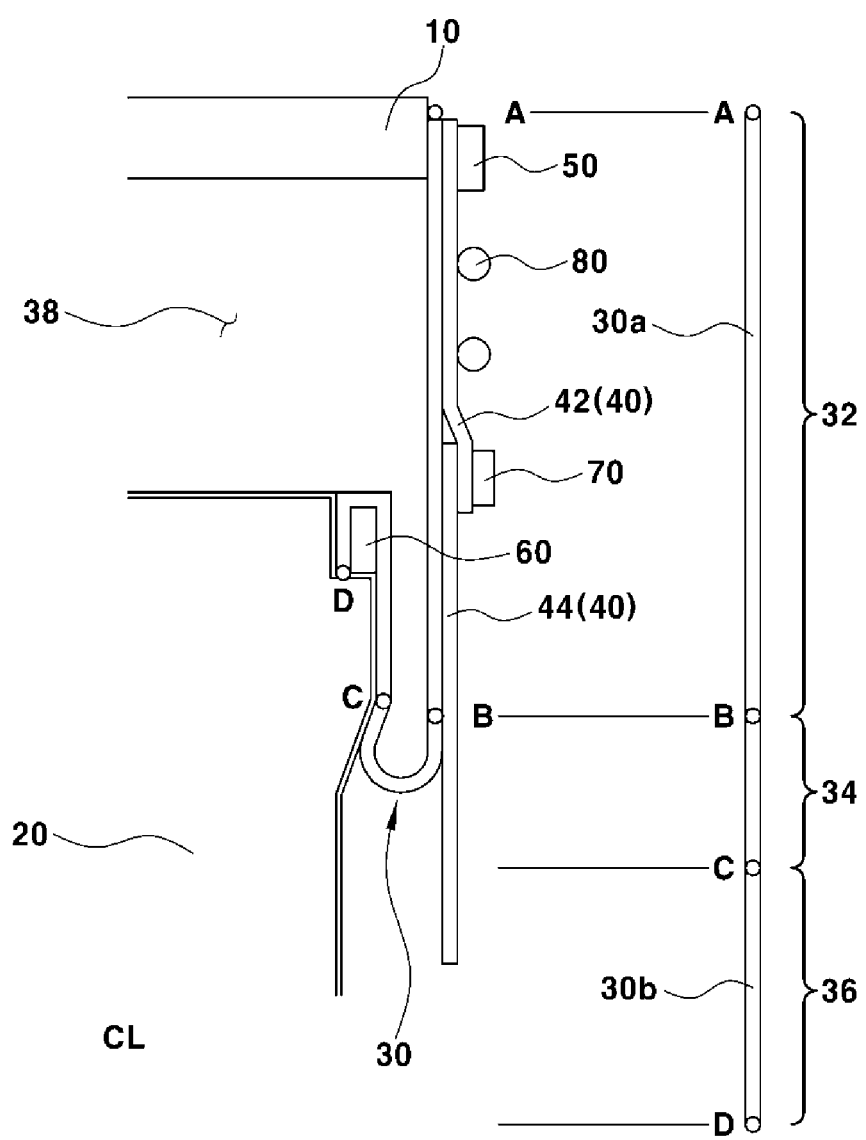
FIG. 7 is a diagram illustrating only the right portion of FIG. 6.

As illustrated in FIG. 6 and FIG. 7, an air spring 1 according to various exemplary embodiments of the present invention includes end members 10, 20, a bellows 30, and a jacket 40.

The end members 10, 20 include a first end member 10 and a second end member 20. The first end member 10 and the second end member 20 are spaced from each other and coupled to respective sides of the flexible bellows 30.

According to various exemplary embodiments of the present invention, the first end member 10 is an end cap configured to be connected to a vehicle body, and the second end member 20 is a piston of an air suspension device. If the air spring according to various exemplary embodiments of the present invention is provided in a vehicle, the piston performs a relative vertical motion or rotational motion with respect to the end cap if a suspension device for a vehicle is bumped or rebounded and/or a steering device is steered. Then the flexible bellows 30 is configured to absorb torsion and cardanic movement while the shape of the flexible bellows is deformed. However, the air spring according to various exemplary embodiments of the present invention may also be adopted other than in a vehicle.

The flexible bellows 30 includes two end portions. A first end portion 30a being any one of the two end portions is airtightly coupled to the first end member 10, and a second end portion 30b being the other end portion of the two end portions is sealingly coupled to the second end member 20.

The flexible bellows 30 extends between the first end member 10 and the second end member 20, and the flexible bellows 30 is longer than a distance between the first end member 10 and the second end member 20. In a state of being mounted on the end members 10, 20, the flexible bellows 30 extends from the first end portion 30a at the first end member 10 side and further extends with a predetermined distance through the second end member 20 to form a valley. The flexible bellows 30 changes a direction while forming the valley to return to the second end member 20 side and is coupled to the second end member 20. According to various exemplary embodiments of the present invention, the flexible bellows 30 includes a first portion 32, a motion portion 34, and a second portion 36 along the axial direction thereof.

The first portion 32 extends from the first end portion 30a and passes by the second end members 20 side with a predetermined distance. The first portion 32 is longer than the distance between the first end member 10 and the second end member 20.

The motion portion 34 is a portion where motion and deformation mainly occur in the flexible bellows 30 and disposed between the second end member 20 and a guide tube 44 to be described later. The motion portion 34 extends from the first portion 32, forms a curve, and directs toward the second end member 20.

The second portion 36 extends from the motion portion 34, includes the second end portion 30b, and is coupled to the second end member 20.

Figure 8:
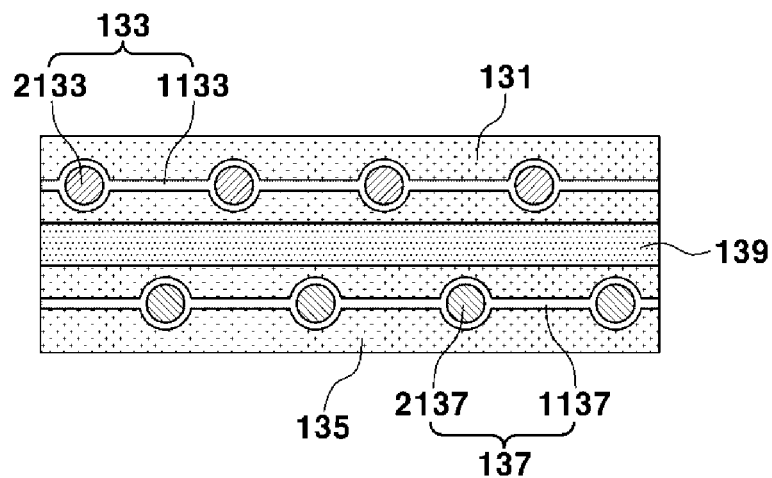
FIG. 8 is a thickness directional cross-sectional diagram illustrating the flexible bellows of the air spring according to various exemplary embodiments of the present invention.

Referring to FIG. 8, the flexible bellows 30 has a certain thickness, includes two or more rubber layers and two or more cords, and is made of an elastic material. According to various exemplary embodiments of the present invention, the rubber layer includes an internal rubber layer 131 and an external rubber layer 135. In addition, the rubber layer may further include an intermediate rubber layer 139.

The internal rubber layer 131 neighbors a fluid chamber 38 and mounted closer to the center line (CL) of the flexible bellows 30. The internal rubber layer 131 is provided with an internal cord layer 133 to withstand high pressure air inside the flexible bellows 30. The internal cord layer 133 includes a plurality of internal cords 2133 disposed in a preset pattern by an adhesion layer 1133. The internal cord layer 133 is coupled to the internal rubber layer 131 by the adhesion layer 1133.

The external rubber layer 135 is provided farther than the center line (CL) of the flexible bellows 30 compared to the internal rubber layer 131. The external rubber layer 135 is also provided with an external cord layer 137 to withstand high pressure air inside the flexible bellows 30. The external cord layer 137 includes a plurality of external cords 2137 disposed in a predetermined pattern by an adhesion layer 1137. The external cord layer 137 is coupled to the external rubber layer 131 by the adhesion layer 1137.

The intermediate rubber layer 139 is interposed between the internal rubber layer 131 and the external rubber layer 135. The intermediate rubber layer 139 maintains an interval between the internal cord layer 133 and the external cord layer 137.

According to various exemplary embodiments of the present invention, the flexible bellows 30 is manufactured in the order of the internal rubber layer 131, the internal cord layer 133, the intermediate rubber layer 139, the external cord layer 137, and the external rubber layer 135. The internal rubber layer 131, the internal cord layer 133, the intermediate rubber layer 139, the external cord layer 137, and the external rubber layer 135 are cured together through the vulcanization process so that the flexible bellows 30 is formed. However, the instant manufacturing process is merely an example for manufacturing the flexible bellows and the flexible bellows according to various exemplary embodiments of the present invention may be manufactured using other methods. That is, the manufacturing order between the rubber layers or the cord layers or the like may also be modified.

Figure 9A:
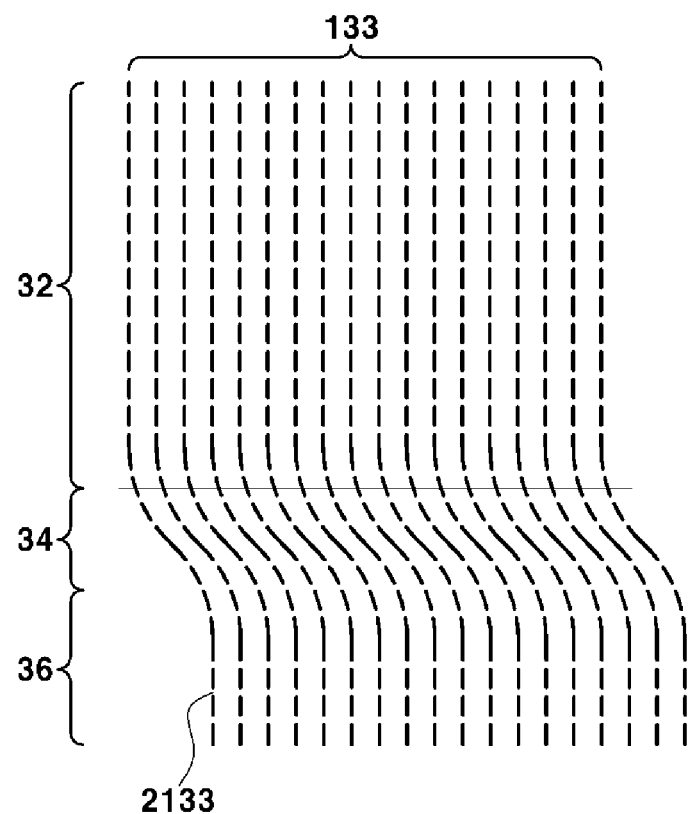
FIG. 9A is a diagram illustrating the placement form of an internal cord layer of the flexible bellows according to various exemplary embodiments of the present invention.
Figure 9B:
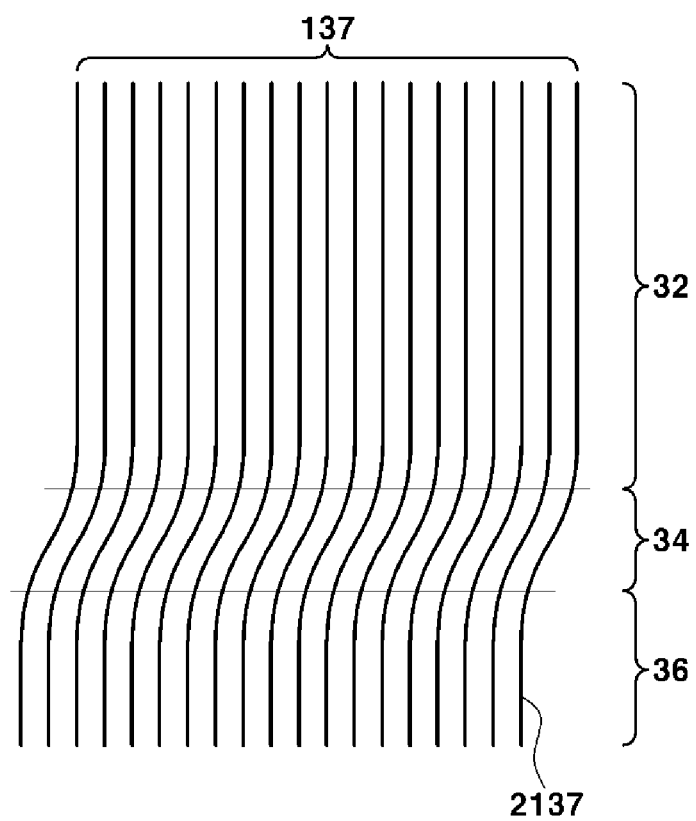
FIG. 9B is a diagram illustrating the placement form of an external cord layer of the flexible bellows according to various exemplary embodiments of the present invention.
Figure 9C:
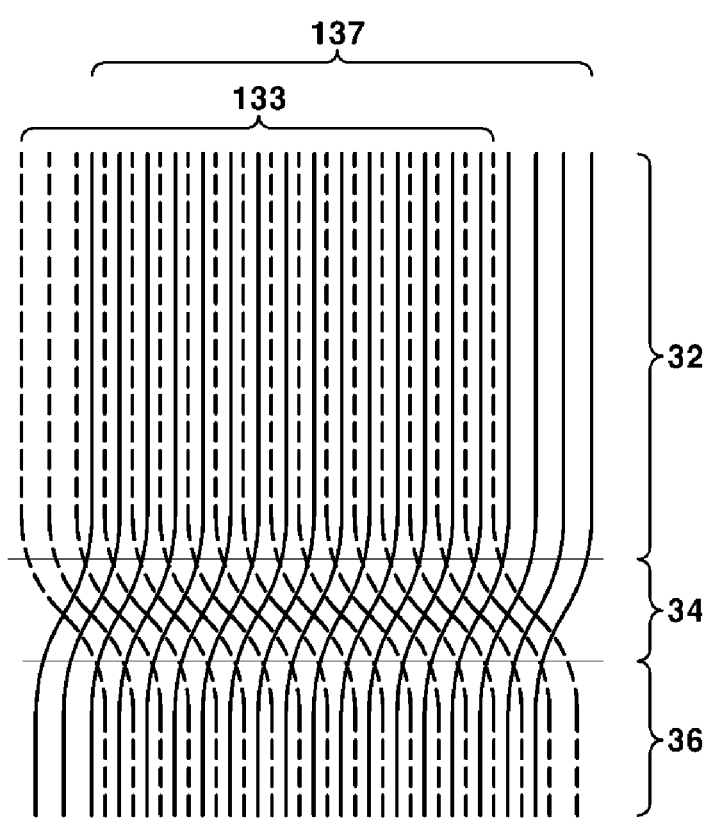
FIG. 9C is a diagram illustrating the placement form of the internal cord layer and the external cord layer of the flexible bellows according to various exemplary embodiments of the present invention.
Figure 9D:
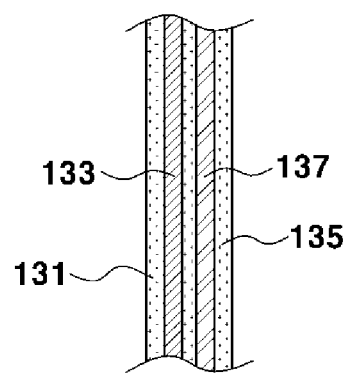
FIG. 9D is a longitudinal cross-sectional diagram illustrating the flexible bellows according to various exemplary embodiments of the present invention.

FIG. 9A illustrates the internal cord layer 133, FIG. 9B illustrates the external cord layer 137, FIG. 9C illustrates an arrangement where the internal cord layer 133 and the external cord layer 137 overlap with each other, and FIG. 9D illustrates a longitudinal cross-sectional diagram of FIG. 9C. Although the internal cord layer 133 has been illustrated by the dotted line in the figure, the dotted line is used only for clearly distinguishing between the internal cord layer 133 and the external cord layer 137 in FIG. 9C. Using the dotted line does not mean that the internal cord layer 133 includes a material necessarily different from that of the external cord layer 137. The internal cord layer and the external cord layer may be made of the same materials or of different materials.

Referring to FIG. 9A, FIG. 9B, FIG. 9C, and FIG. 9D, the internal cord 2133 and the external cord 2137 are provided in the axial ply structure in the first portion 32 and the second portion 36. The internal cord 2133 and the external cord 2137 are mounted in the inclined cross ply structure in the motion portion 34. The internal cord 2133 and the external cord 2137 extend in parallel to each other in the first portion 32 and the second portion 36, and the internal cord 2133 and the external cord 2137 obliquely extend in different directions in the motion portion 34. More As illustrated in FIG. 9A, FIG. 9B, FIG. 9C, and FIG. 9D, when the internal cord 2133 is configured to extend obliquely rightward with respect to the extending direction of the internal cord 2133 or the axial center line (CL) of the air spring in the motion portion 34, the external cord 2137 is configured to obliquely extend leftward. Therefore, the internal cord layer 133 and the external cord layer 137 produces the cross ply structure in the motion portion 34.

As illustrated in FIG. 9A, FIG. 9B, FIG. 9C, and FIG. 9D, according to various exemplary embodiments of the present invention, the internal cord 2133 and the external cord 2137 may have same lengths. The internal cord 2133 and the external cord 2137 are configured to extend throughout all sections including the first portion 32, the motion portion 34, and the second portion 36.

Figure 10:
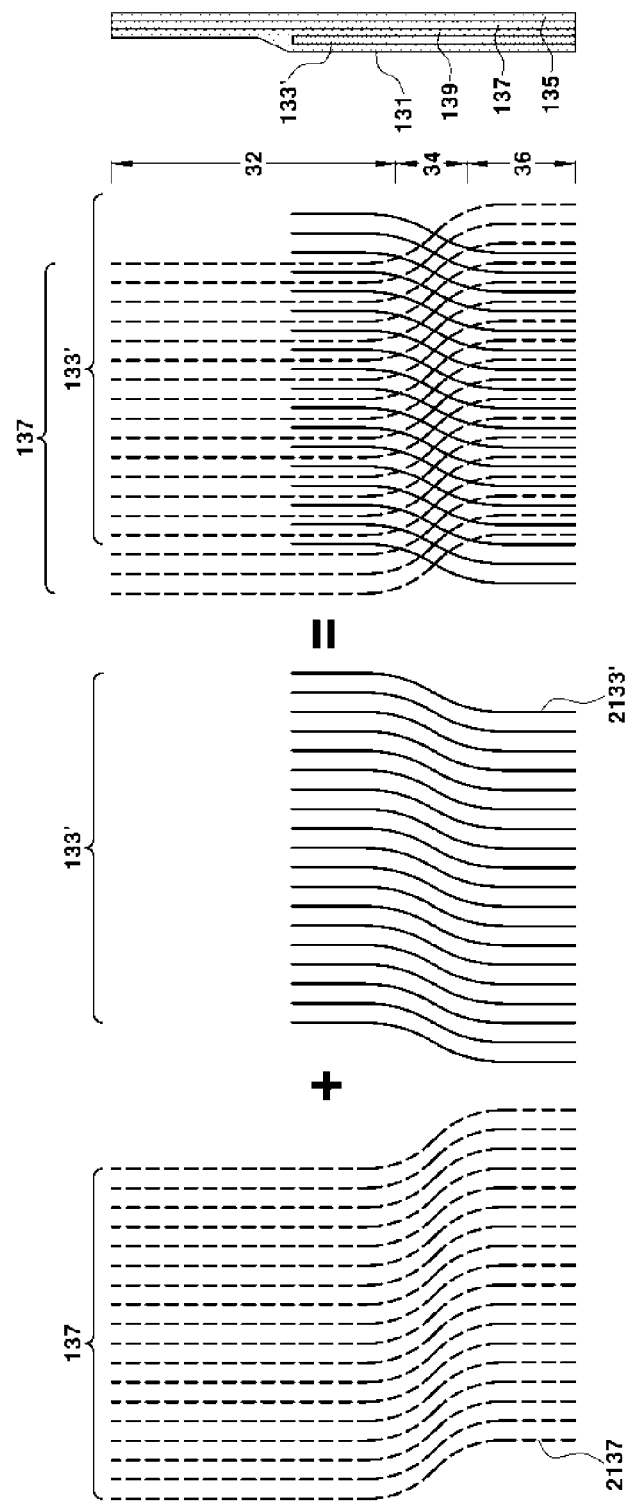
FIG. 10 is a diagram illustrating the placement form of the internal cord layer and the external cord layer according to some exemplary embodiments of the present invention.

In FIG. 10 as well, the external cord 2137 is marked by the dotted line only for distinguishing between an internal cord 2133' and the external cord 2137 in the figure.

As illustrated in FIG. 10, according to various exemplary embodiments of the present invention, the internal cord 2133' may have a shorter length than the external cord 2137. That is, the internal cord 2133' and the external cord 2137 are disposed in the cross ply structure in the motion portion 34 and in the axial ply structure in the first portion 32 and the second portion 36 in the same manner as above. The external cord 2137 extends throughout all sections of the first portion 32, the motion portion 34, and the second portion 36, while the internal cord 2133' extends in a portion of the first portion 32, the motion portion 34, and the second portion 36. The internal cord 2133' of the internal cord layer 133' may extend from a location of the first portion 32, which is higher than the motion portion 34 by a certain length, to the second portion 36. According to the instant embodiments, the internal cord 2133' and the external cord 2137 form the cross ply structure in the motion portion 34 vulnerable to durability and form the axial ply structure in the portion of the first portion 32 and the second portion 36. The internal cord 2133' and the external cord 2137 form the cross ply structure in the motion portion 34 by changing the direction of each of the internal cord 2133' and the external cord 2137. Therefore, it is possible to maximize torsion absorption ability of the flexible bellows and improve durability of the motion portion 34.

The flexible bellows 30 has an empty space inside that forms the fluid chamber 38. A fluid includes high pressure air. That is, the high pressure air acts on the internal side of the flexible bellows 30, and expansion of the external side thereof is suppressed by the jacket 40 and the second end member 20.

The jacket 40 is mounted on the circumference of the flexible bellows 30 and supports the flexible bellows 30. According to various exemplary embodiments of the present invention, the jacket 40 includes a sleeve 42 and a guide tube 44.

The sleeve 42 is mounted on the external side of the flexible bellows 30 and placed on at least a portion of the flexible bellows 30. The sleeve 42 may extend the first portion 32 of the flexible bellows 30 substantially to the intermediate portion. Alternatively, the sleeve 42 may substantially extend from the first end member 10 side to the second end member 20. Alternatively, the sleeve 42 may extend all along the air spring in the axial direction of the air spring 1.

Figure 11:
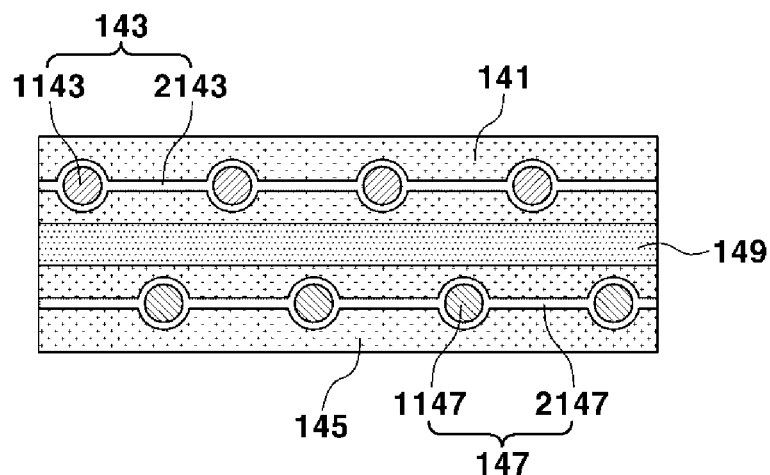
FIG. 11 is a thickness directional cross-sectional diagram illustrating a sleeve of the air spring according to various exemplary embodiments of the present invention.

As illustrated in FIG. 11, the sleeve 42 may include a plurality of rubber layers and cord layers like the flexible bellows 30. According to various exemplary embodiments of the present invention, the sleeve 42 may include a first rubber layer 141 and a second rubber layer 145, and a third rubber layer 149 may also be disposed between the first rubber layer 141 and the second rubber layer 145.

One side of the first rubber layer 141 is in direct contact with the outside of the flexible bellows 30. The other side of the first rubber layer 141 is coupled to the first cord layer 143. The first cord layer 143 includes first cords 1143 configured for enduring the high pressure air inside the flexible bellows 30 and an adhesion layer 2143 connecting the first cords 1143 in a preset pattern and coupling the first cord layer 143 to the first rubber layer 141.

The second rubber layer 145 is formed farther than the first rubber layer 141 with respect to the center line (CL). One side of the second rubber layer 145 is coupled to the second cord layer 147. The second cord layer 147 includes second cords 1147 configured for enduring the high pressure air inside the flexible bellows 30 and an adhesion layer 2147 connecting the second cords 1147 in a preset pattern and coupling the second cord layer 147 to the second rubber layer 145.

The third rubber layer 149 may be included between the first rubber layer 141 and the second rubber layer 145. The third rubber layer 149 is provided to maintain an interval between the first cord layer 143 and the second cord layer 147. That is, the first cord layer 143 is in contact with one side of the third rubber layer 149, and the second cord layer 147 is in contact with the other side of the third rubber layer 149.

The sleeve 42 is sequentially manufactured in the order of the first rubber layer 141, the first cord layer 143, the third rubber layer 149, the second cord layer 147, and the second rubber layer 145, and the sleeve 42 is formed by curing these layers together through the vulcanization process. However, the present manufacturing process is merely one example for manufacturing the sleeve and the sleeve according to various exemplary embodiments of the present invention may be manufactured through other methods. That is, the manufacturing order between the rubber layers or the cord layers may also be modified.

Figure 12:
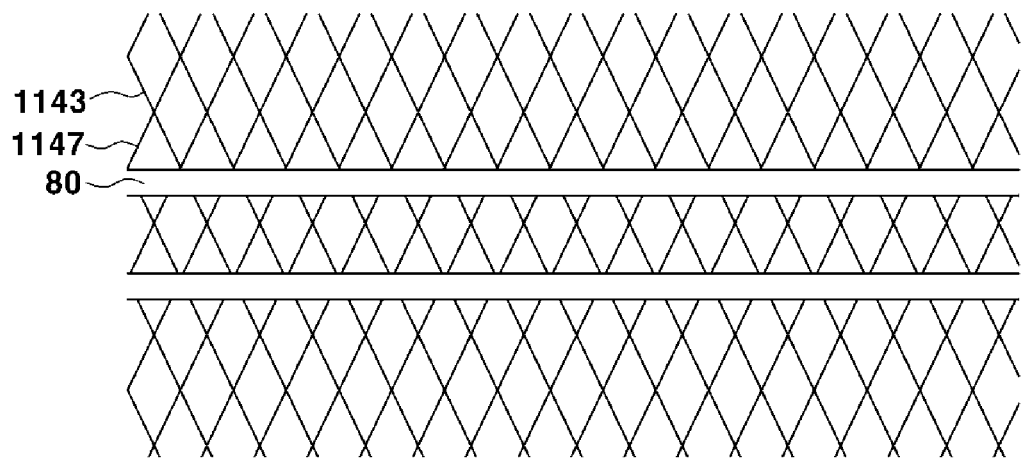
FIG. 12 is a diagram illustrating the placement forms of a first cord yarn and a second cord yarn of the sleeve according to various exemplary embodiments of the present invention.

As illustrated in FIG. 12, the first cord 1143 and the second cord 1147 are formed in the cross ply structure. That is, the first cord 1143 extends to any one of the left and the right with respect to the longitudinal direction or the extending direction of the sleeve 42 at a first angle. On the other hand, the second cord 1147 extends to the other one of the left and the right with respect to the longitudinal direction or the extending direction of the sleeve 42 at the same angle as the first angle. Therefore, the first cord 1143 and the second cord 1147 form a plurality of rhombuses or rectangles while extending. The first angle is 30° to 60°.

The guide tube 44 is mounted on the outside of the flexible bellows 30 and mounted on a portion different from the portion on which the sleeve 42 is mounted at the outside of the flexible bellows 30. A portion of the guide tube 44 may overlap the sleeve 42. The guide tube 44 is positioned on the outside of the flexible bellows 30 close to the motion portion 34 of the flexible bellows 30 and, positioned on the outside of the motion portion 34 or radially outward with respect to the center line (CL).

The first end member 10 is mounted with a first clamp 50. That is, the first end member 10, the first end portion 30a of the flexible bellows 30, and one side of the sleeve 42 receive an additional fixing force by the first clamp 50.

The second end member 20 is mounted with a second clamp 60. The second end portion 30b of the flexible bellows 30 is mounted on the second end member 20 by the second clamp 60.

A third clamp 70 is mounted between the first clamp 50 and the second clamp 60. The third clamp 70 provides an additional fixing force between the other side of the sleeve 42, the guide tube 44, and the flexible bellows 30.

One or more support rings 80 are disposed on the outside of the sleeve 42. The support ring 80 is configured for suppressing the expansion of the flexible bellows 30.

Figure 13:
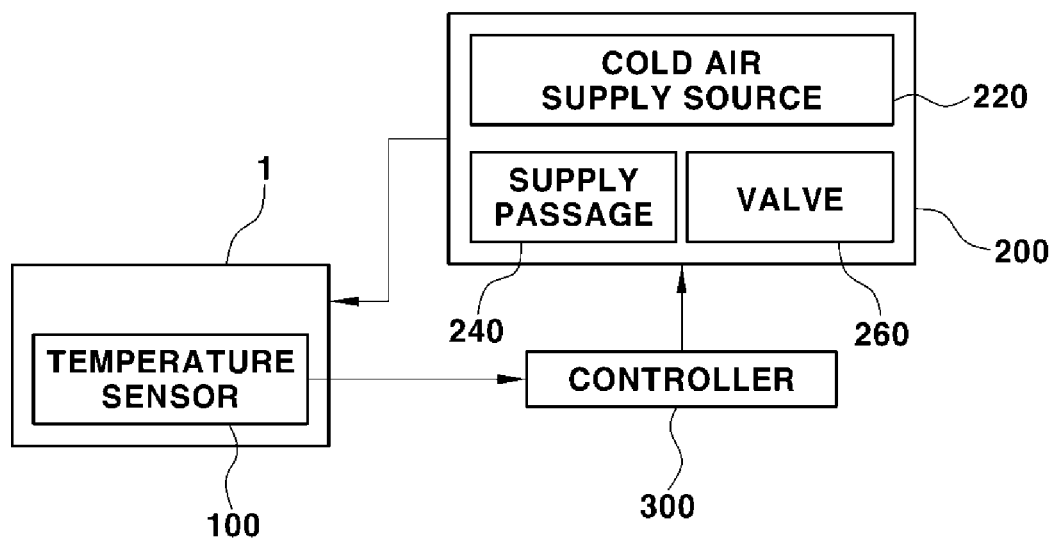
FIG. 13 is a diagram illustrating a cold air supply system for the air spring according to various exemplary embodiments of the present invention.
Figure 14:
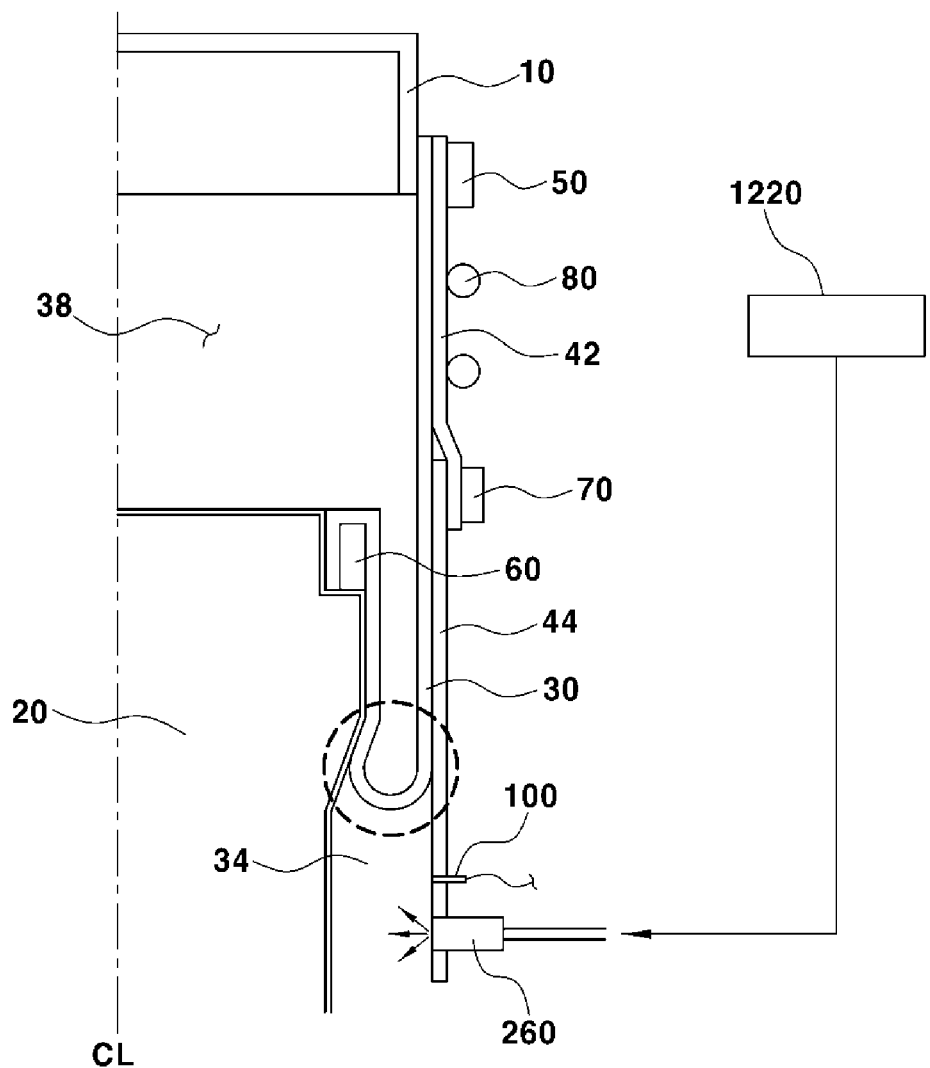
FIG. 14 is a diagram illustrating an air spring including a cold air supply system according to various exemplary embodiments of the present invention.
Figure 15:
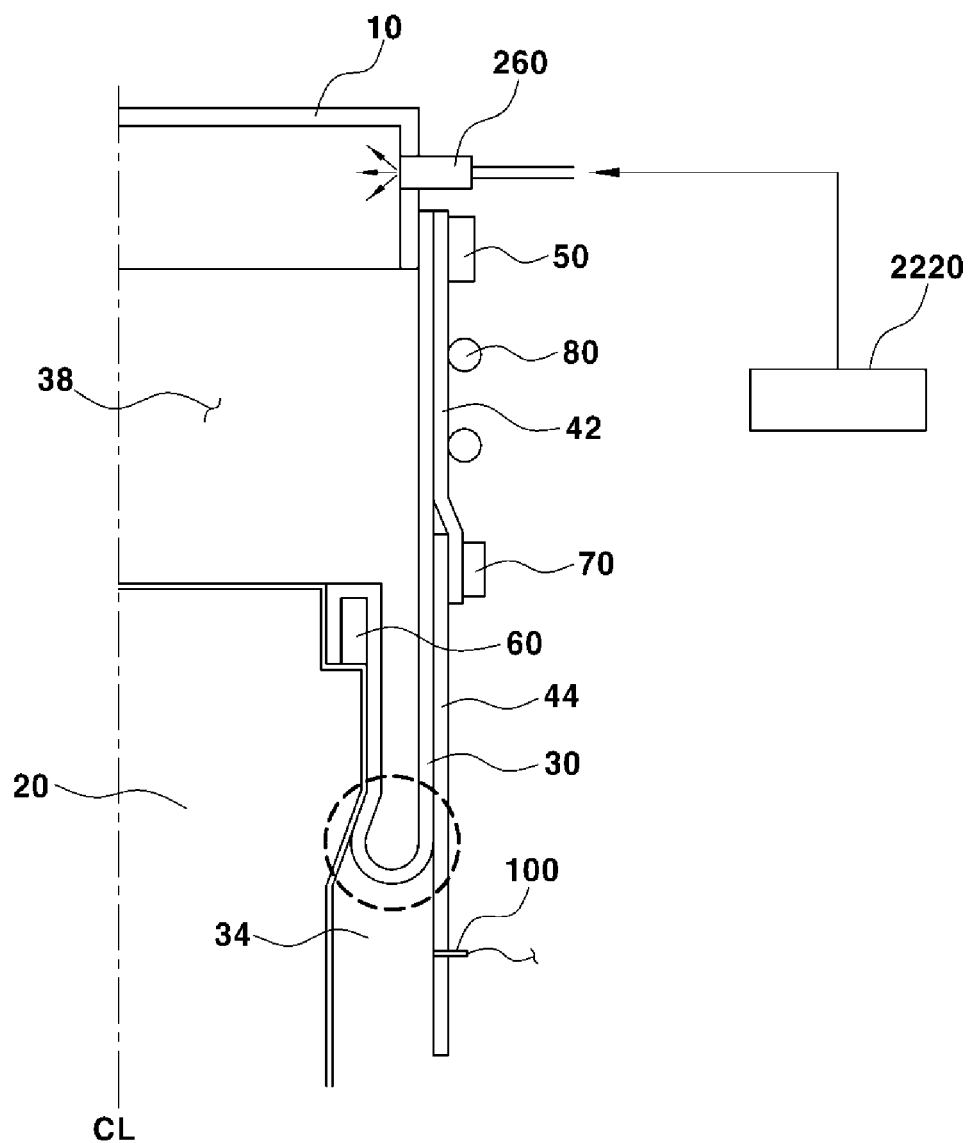
FIG. 15 is a diagram illustrating an air spring including a cold air supply system according to various exemplary embodiments of the present invention.

As illustrated in FIGS. 13 to 15, according to various exemplary embodiments of the present invention, to prevent aging due to the engine heat, the air spring may be configured to be supplied with cold air. To this end, according to various exemplary embodiments of the present invention, the air spring includes a temperature sensor 100, a cold air supply unit 200, and a controller 300.

The temperature sensor 100 is disposed in the air spring 1 to detect the temperature around the motion portion 34 in real time. According to various exemplary embodiments of the present invention, the temperature sensor 100 is provided on the guide tube 44.

The cold air supply unit 200 is configured to provide cold air to the air spring 1 based on measurements of the temperature sensor 100. According to various exemplary embodiments of the present invention, the cold air supply unit 200 may include a cold air supply source 220, a supply passage 240, and a valve 260. The cold air is transferred from the cold air supply source 220 to the supply passage 240, and the cold air is provided to the air spring 1 by an opening and closing control of the valve 260.

According to various exemplary embodiments of the present invention, the cold air supply source 220 may be an air conditioning system 1220 for a vehicle. If the supply of the cold air is needed, the air conditioning system 1220 for a vehicle may provide low temperature and low pressure air to the air spring. According to various exemplary embodiments of the present invention, the cold air supply source 220 may be a compressor 2220 for the air suspension device configured for a vehicle, and if necessary, the compressor 2220 may supply low temperature and high pressure air to the fluid chamber 38, decreasing the overall temperature of the flexible bellows 30. According to various exemplary embodiments of the present invention, the cold air supply source 220 is not limited to these examples and may be appropriately selected at a place where the air spring is used.

As illustrated in FIG. 14, according to various exemplary embodiments of the present invention, the supply passage 240 may be provided so that the cold air is supplied to the outside of the fluid chamber 38 of the air spring 1. That is, the supply passage 240 is connected to the guide tube 44 and may be configured to supply the cold air to around the motion portion 34 defined by the external surface of the flexible bellows 30, the second end member 20, and the guide tube 44.

As illustrated in FIG. 15, according to various exemplary embodiments of the present invention, the supply passage 240 may be led to the internal to the fluid chamber 38. The first end member 10 may be connected to the supply passage 240 so that the cold air by the supply passage 240 is introduced into the first end member 10 side thereof.

The controller 300 may control the cold air supply unit 20 based on the temperature measured by the temperature sensor 100. If the temperature measured by the temperature sensor 100 is equal to or greater than a predetermined temperature, the controller 300 opens the valve 260 so that the cold air from the cold air supply source 220 may be supplied to the air spring through the supply passage 240.

As described above, the air spring according to various exemplary embodiments of the present invention may improve durability of the flexible bellows 30. That is, the main problem with durability of the air spring is caused by damage of the flexible bellows. The flexible bellows are generally damaged by the influence by excessive torsion applied to the flexible bellows (operation conditions) when the suspension device is in bump or rebound movements and/or if the steering device is steered and the influence by aging of the rubber bellows due to atmospheric temperature and engine heat upon long period of use (environmental conditions).

The flexible bellows 30 may be disposed in the axial ply form in the first portion 32 and the second portion 36 other than the motion portion 34, maximizing the torsion absorption ability of the flexible bellows 30. In addition, the flexible bellows 30 adopts the cross ply structure in the motion portion 34 in which the rubber layer is vulnerable to damage due to the occurrence of stress concentration upon aging of the rubber layer. Therefore, it is possible to minimize the stress concentration applied to the rubber layer of the flexible bellows 30. As a result, the present invention may maximally utilize the torsion absorption ability of the flexible bellows 30 and also exclude the possibility of damage due to aging compared to the conventional technology.

In addition, unlike the conventional technology, the present invention may have a structure where the respective cords and cord layers are connected as one, that is, have no overlapping portion therebetween, having excellent load transfer ability, and may have a simple structure, preventing deterioration of quality due to the bonding between the flexible bellows 30.

In the axial ply structure having excellent torsion absorption ability, the flexible bellows 30 is damaged upon aging of the rubber layer between the respective cords, and the aging is mainly caused by the engine heat.

The factor largely affecting the durability of the flexible bellows having the axial ply structure is the aging of the rubber bellows due to the thermal load of an engine compartment. The rubber bellows continuously deteriorates upon long period of use of a vehicle, degrading the physical property, such as tensile strength or elongation, and thus being easily damaged even upon small load input.

According to the aging characteristics test of the flexible bellows used, it may be seen that when the operating temperature of the flexible bellows is reduced by 20° C. (for example, 100° C. to 80° C.), the durable life is increased by about twice (300 hours (HR) to 600 hours). Therefore, the present invention may cool the motion portion of the flexible bellows by continuously supplying low-temperature air to the motion portion of the flexible bellows, preventing the heat aging of the flexible bellows and increasing the life of the flexible bellows. Referring back to FIG. 14, the present invention may continuously supply the cold air (for example, 5 to 10° C.) to the lower side of the motion portion 34 of the flexible bellows 30, preventing the aging of the flexible bellows 30.

In addition, the term "controller", "control unit" or "control device" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller or the control unit may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

In an exemplary embodiment of the present invention, each operation described above may be performed by a controller, and the controller may be configured by multiple controllers, or an integrated single controller.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An air spring apparatus comprising:
a first end member and a second end member spaced from each other;
a flexible bellows having a first end portion airtightly coupled to the first end member, a second end portion airtightly coupled to the second end member, a fluid chamber formed in the flexible bellows, and a motion portion, wherein the flexible bellows disposed between the first end member and the second end member is extendable further than the second end member so that a length of the flexible bellows is longer than a distance between the first end member and the second end member, and is bent to the second end member to be coupled to the second end member to form the motion portion; and
a jacket mounted on a circumference of the flexible bellows and configured to support the flexible bellows,
wherein the flexible bellows includes:
inner cords formed in the flexible bellows at a side of the fluid chamber; and
external cords formed outward than the internal cords in the flexible bellows,
wherein the internal cords and the external cord are aligned to extend in parallel to each other in the flexible bellows other than the motion portion, and
wherein in the motion portion, the internal cords are aligned to obliquely extend a first direction and the external cords are aligned to obliquely extend in a second direction which is a direction opposite to the first direction.

2. The air spring apparatus of claim 1, wherein the first end member is an end cap configured to be connected to a vehicle body.

3. The air spring apparatus of claim 1, wherein the second end member is a piston configured to be movable inside the flexible bellows in an axial direction of the flexible bellows.

4. The air spring apparatus of claim 1, further including:
a temperature sensor disposed adjacent to the motion portion to measure a temperature of the motion portion; and
a cold air supply unit configured to supply air to an interior of the jacket when the temperature measured by the temperature sensor is greater than a preset temperature.

5. The air spring apparatus of claim 4, wherein the cold air supply unit includes: at least one of a first cold air supply unit connected to a guide tube provided radially outward the second end member to supply the air to around the motion portion and a second cold air supply unit connected to the first end member so that the air is introduced into the flexible bellows.

6. The air spring apparatus of claim 1, further including:
a first clamp fixed at the first end portion of the flexible bellows so that the first end member and the first end portion of the flexible bellows are supported by the first clamp;
a second clamp fixed at the second end portion of the flexible bellows so that the second end portion of the flexible bellows is mounted on the second end member by the second clamp; and
a third clamp fixing the flexible bellows and the jacket between the first end member and the second end member.

7. The air spring apparatus of claim 6, wherein the jacket includes:
a sleeve mounted on the circumference of the flexible bellows and having a first portion fixed by the first clamp and a second portion fixed by the third clamp; and
a guide tube mounted on the circumference of the flexible bellows and having one side fixed by the third clamp.

8. The air spring apparatus of claim 7, further including:
a support ring mounted on an outer circumference of the sleeve between the first clamp and the second clamp.

9. The air spring apparatus of claim 7, wherein the sleeve includes:
at least two rubber layers; and
first cords and second cords formed inside each of the at least two rubber layers, respectively, and
wherein the first cords are formed obliquely toward a first side thereof, and the second cords are formed obliquely toward a second side thereof.

10. The air spring apparatus of claim 1, wherein the flexible bellows further includes:
a first portion extending from the first end portion of the flexible bellows to a first side of the motion portion; and
a second portion extending from a second side of the motion portion to the second end portion of the flexible bellows.

11. The air spring apparatus of claim 10, wherein the internal cords are formed on only a portion of the first portion.

12. The air spring apparatus of claim 10, wherein the internal cords and the external cords extend throughout all of the first portion, the motion portion, and the second portion.

13. An air spring apparatus comprising:
a first end member and a second end member spaced from each other;
a flexible bellows having a first end portion airtightly coupled to the first end member, a second end portion airtightly coupled to the second end member, a fluid chamber formed in the flexible bellows, and including a plurality of rubber layers and cords, wherein the flexible bellows includes:
a first portion extending from the first end member and passing the second end member with a predetermined distance to be formed longer than a distance between the first end member and the second end member;
a motion portion extending from the first portion in a first direction and being formed to change a direction thereof toward the second end member in a second direction; and
a second portion extending from the motion portion in the second direction and coupled to the second end member;
a jacket mounted on a circumference of the flexible bellows and configured to support the flexible bellows;
a temperature sensor disposed adjacent to the motion portion; and
a cold air supply unit configured to supply air to an interior of the jacket when a temperature measured by the temperature sensor is greater than a predetermined temperature.

14. The air spring apparatus of claim 13, wherein the flexible bellows includes, along a thickness direction thereof, an internal rubber layer formed adjacent to the fluid chamber and including internal cords; and an external rubber layer coupled to an outside of the internal rubber layer and including external cords.

15. The air spring apparatus of claim 14, wherein the internal cords and the external cords are formed in parallel to an extending direction of the flexible bellows in the first portion and the second portion, and wherein in the motion portion, the internal cords are configured to extend to one of the left and the right with respect to the extending direction at a first angle, and the external cords are configured to extend to another one of the left and the right with respect to the extending direction at the first angle.

16. The air spring apparatus of claim 15, wherein the internal cords and the external cords extend by changing a direction at a portion where the motion portion and the second portion meet to be in parallel to the extending direction of the flexible bellows.

17. The air spring apparatus of claim 13, wherein the jacket further includes a guide tube mounted on an external circumference of the motion portion of the flexible bellows and provided with the temperature sensor.

18. The air spring apparatus of claim 13, wherein the air supply unit is an air conditioning system of a vehicle.

19. The air spring apparatus of claim 13, wherein the air supply unit is a compressor for an air suspension device for a vehicle.

\* \* \* \* \*